(12) United States Patent
Ludwig et al.

(10) Patent No.: US 11,818,538 B2
(45) Date of Patent: Nov. 14, 2023

(54) SYSTEM AND METHOD FOR MANAGING CONTENT OF IN VEHICLE INFOTAINMENT SYSTEMS

(71) Applicant: Harman International Industries, Incorporated, Stamford, CT (US)

(72) Inventors: Chris Ludwig, Bloomfield Hills, MI (US); Riley Winton, Opelika, AL (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 29 days.

(21) Appl. No.: 16/953,181

(22) Filed: Nov. 19, 2020

(65) Prior Publication Data

US 2021/0204057 A1 Jul. 1, 2021

Related U.S. Application Data

(60) Provisional application No. 62/954,210, filed on Dec. 27, 2019.

(51) Int. Cl.
| | |
|---|---|
| *H04R 1/40* | (2006.01) |
| *H04R 3/12* | (2006.01) |
| *H04R 29/00* | (2006.01) |
| *B60K 37/02* | (2006.01) |

(52) U.S. Cl.
CPC ............ *H04R 1/403* (2013.01); *B60K 37/02* (2013.01); *H04R 3/12* (2013.01); *H04R 29/001* (2013.01); *B60K 2370/164* (2019.05); *H04R 2499/13* (2013.01)

(58) Field of Classification Search
CPC ........ H04R 1/403; H04R 3/12; H04R 29/001; H04R 2499/13; B60K 37/02; B60K 2370/164

USPC ........ 381/86, 302, 389, 365, 71.4, 104, 107, 381/150, 111; 709/221; 717/168, 173
See application file for complete search history.

(56) References Cited

U.S. PATENT DOCUMENTS

| | | | | |
|---|---|---|---|---|
| 2010/0142724 | A1* | 6/2010 | McManus | H04B 1/207 381/86 |
| 2015/0356665 | A1* | 12/2015 | Colson | G06Q 30/0635 705/26.81 |
| 2015/0381297 | A1* | 12/2015 | Cepuran | H04H 60/15 455/352 |
| 2016/0270248 | A1* | 9/2016 | Troemel, Jr. | B60R 11/02 |
| 2019/0068152 | A1* | 2/2019 | Gautama | H04R 29/001 |

(Continued)

FOREIGN PATENT DOCUMENTS

EP 3136749 A1 3/2017

OTHER PUBLICATIONS

European Patent Office, Extended European Search Report Issued in Application No. 20211808.9, dated Apr. 23, 2021, Germany, 8 pages.

*Primary Examiner* — Vivian C Chin
*Assistant Examiner* — Con P Tran
(74) *Attorney, Agent, or Firm* — McCoy Russell LLP

(57) ABSTRACT

Systems and methods for managing content of a vehicle infotainment system are presented. In one example, one or more servers may activate and deactivate hardware components and software modules for vehicle infotainment systems to scale functionality and performance of the vehicle infotainment systems. The servers may receive upgrade and downgrade requests via a plurality of sources.

20 Claims, 10 Drawing Sheets

(56) References Cited

U.S. PATENT DOCUMENTS

2019/0087148 A1* 3/2019 Goel ................... G06F 3/1423
2019/0115014 A1  4/2019 Hansen et al.
2020/0186620 A1* 6/2020 Golgiri ................ B60W 50/14

* cited by examiner

SYSTEM AND METHOD FOR MANAGING CONTENT OF IN VEHICLE INFOTAINMENT SYSTEMS

CROSS REFERENCE TO RELATED APPLICATIONS

The present application claims priority to U.S. Provisional Application No. 62/954,210, entitled "SYSTEM AND METHOD FOR MANAGING CONTENT OF IN VEHICLE INFOTAINMENT SYSTEMS", and filed on Dec. 27, 2019. The entire contents of the above-listed application are hereby incorporated by reference for all purposes.

BACKGROUND

The disclosure relates to simplifying vehicle complexity via a scalable infotainment system.

SUMMARY

Vehicle manufactures may offer several different levels of options for a particular vehicle model so that consumers may select features and pricing that suits their needs and wants. The options may include a base audio or infotainment system for a base vehicle model, a non-branded premium level infotainment system for middle level vehicle models, and a premium branded infotainment system for top level vehicle models. Each of the base, non-branded, and branded infotainment systems may have unique sets of speakers, unique amplifiers, unique system architecture, and unique software. Consequently, a manufacturer may have unique installation procedures, unique storage facilities, unique use instructions, and unique parts manifests for each level of vehicle. Further, several different levels of infotainment systems for a single vehicle model may increase vehicle assembly complexity, increase space used to manufacture a vehicle, and increase space needed for storing replacement components. Therefore, it may be desirable to provide end users or customers with an infotainment system that meets the end user's functionality and cost considerations while reducing vehicle assembly complexity and space requirements for vehicle manufacturers.

The inventors have recognized the previously mentioned issues and have developed systems and methods to at least partially address the above issues. In particular, the inventors have developed a infotainment content management system, comprising: one or more servers configured to receive requests to activate at least a portion of hardware components and software modules of a plurality of infotainment systems included in a plurality of vehicles, the one or more servers also including executable instructions to activate at least the portion of the hardware components and software modules.

By selectively activating hardware components and software modules of an infotainment system via one or more servers that are located remotely from a vehicle that includes the infotainment system, it may be possible to provide the technical result of reducing complexity of vehicle assembly. Further, cost to manufacture the infotainment system may be reduced by increase in infotainment system volume. Further still, the infotainment content management system may allow end users or customers to select features and price points that meet their needs at time of vehicle sale or afterward.

The present description may provide several advantages. Specifically, the approach may reduce complexity of vehicle assembly. In addition, the approach may allow infotainment system features and functionality to be scaled at time of vehicle sale or thereafter. Further, the approach may enable unique revenue models that may be beneficial to infotainment system manufacturers as well as vehicle manufacturers.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present disclosure relates to managing content of infotainment systems in vehicles. At least some hardware components of a vehicle infotainment system may be selectively activated and deactivated to scale performance and capabilities of the vehicle infotainment system. For example, a head unit and an amplifier may be common across several performance levels of infotainment systems that are offered for a particular vehicle model. Hardware components of the head unit and the amplifier may be selectively activated and deactivated according to a level of infotainment system capability that has been purchased by an end user or customer. For example, input channels for microphones and communication channels or links (e.g., Bluetooth, etc.) may be selectively activated and deactivated. Further, surround sound speaker channels and amplifier channels may be selectively activated and deactivated according to the level of infotainment system capability that has been purchased by the end user. Additionally, software modules of the infotainment system may be activated and deactivated according to the level of infotainment system capability that has been purchased by the end user.

Figure 4:
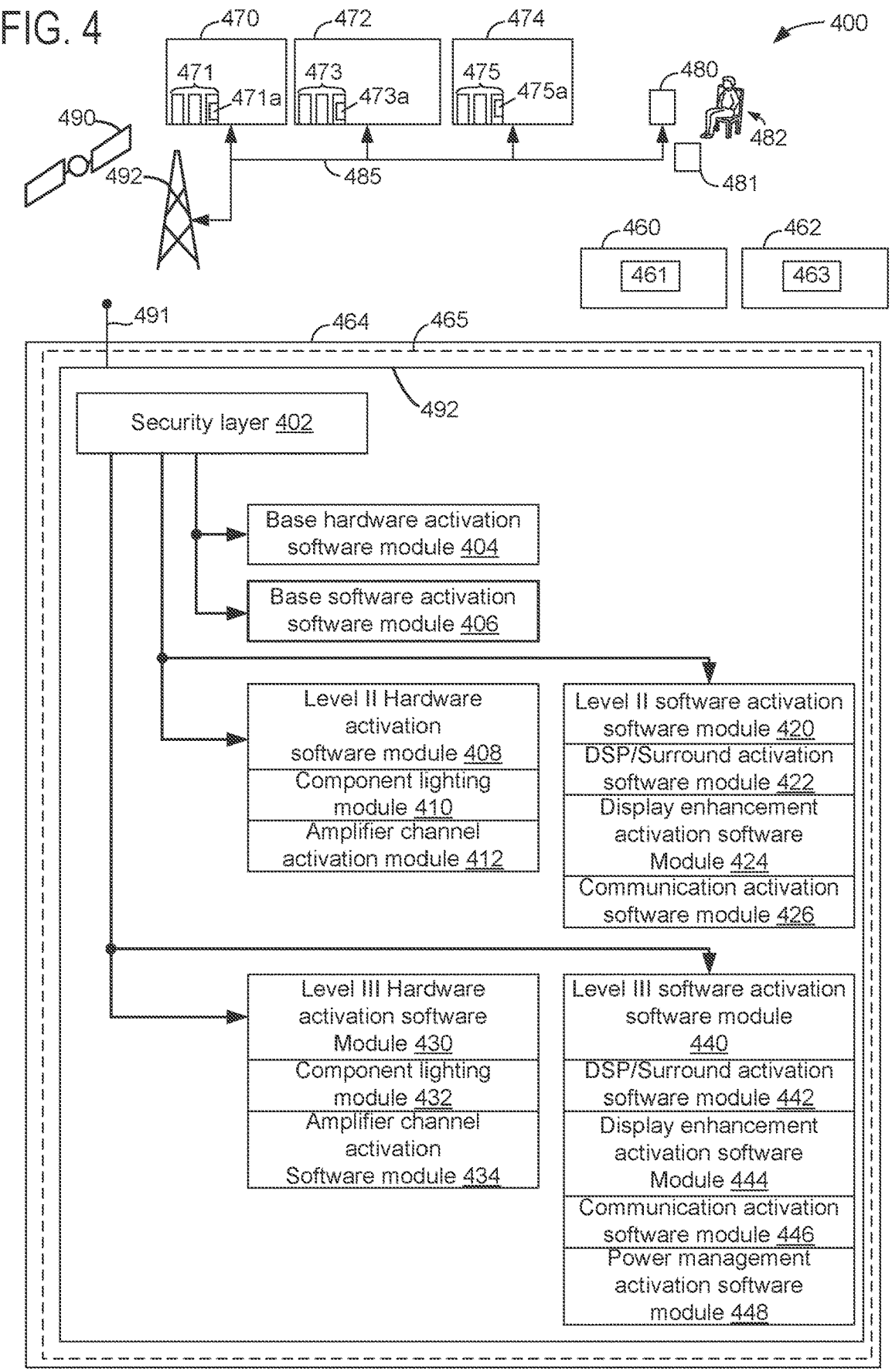
FIG. 4 shows an example content management system for infotainment systems.
Figure 5:
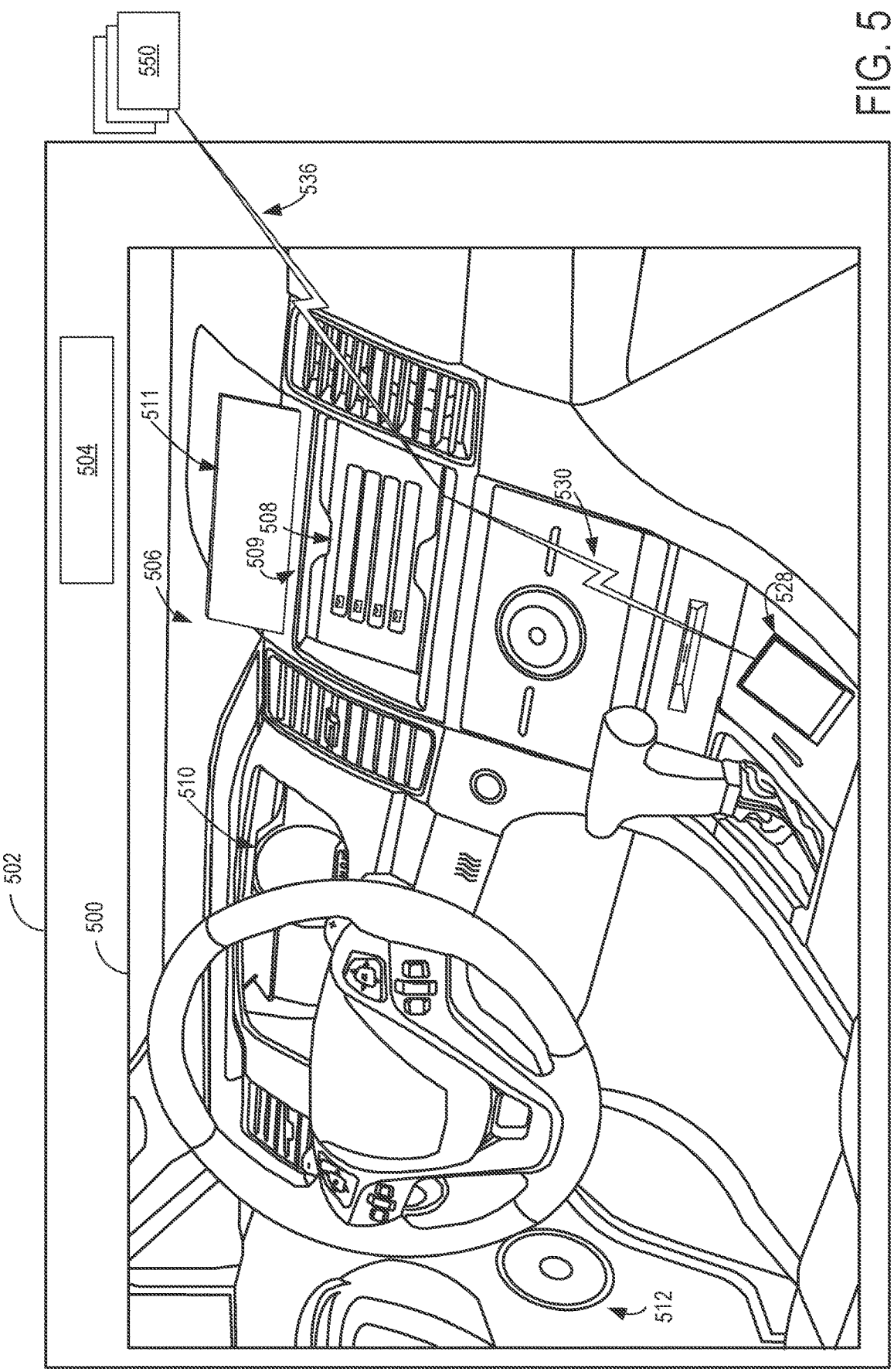
FIGS. 5 and 6 shows a schematic depiction of an example infotainment system in a vehicle.
Figure 6:
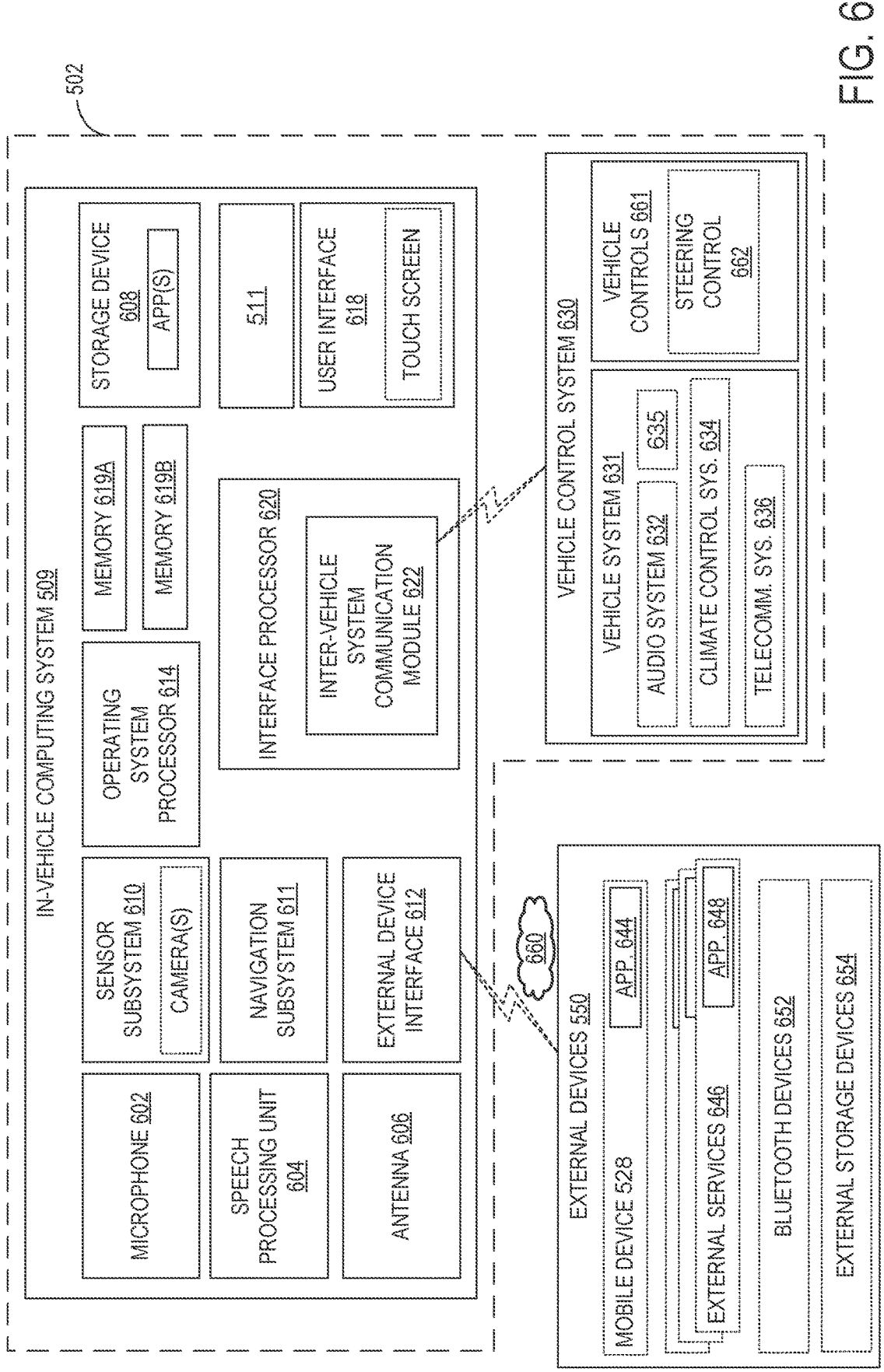

As shown in FIGS. 4-6, a system according to the present disclosure may be comprised of a portion that is remote to a vehicle and a portion that is part of a vehicle. Methods described herein may be carried out via a content management system including components that are included in a vehicle.

Figure 1:
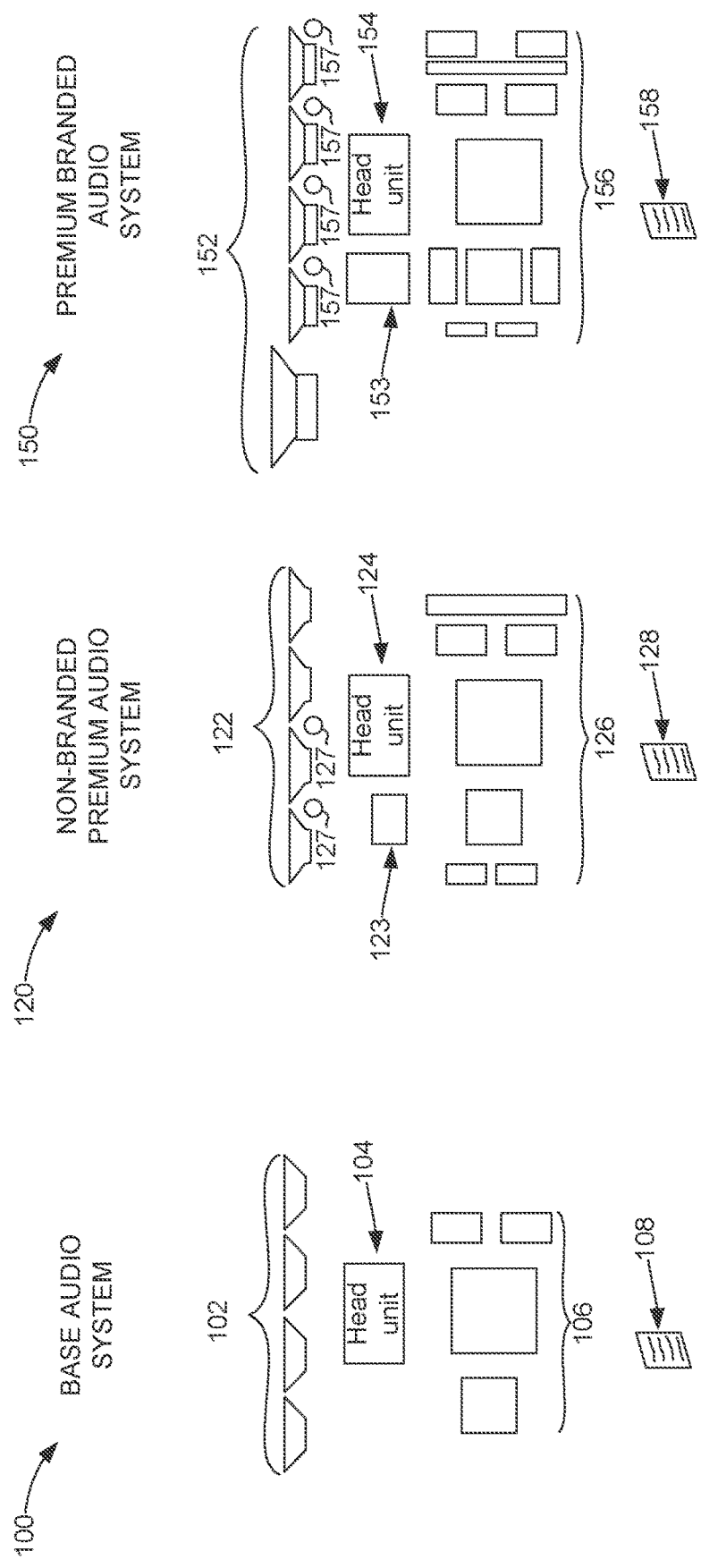
FIG. 1 shows an example schematic view of infotainment system configurations for three different prior art infotainment system levels.

Referring now to FIG. 1 a schematic view of different infotainment systems for a vehicle model is shown. A base level infotainment system 100 may include a plurality of speakers 102, a head unit 104, a base system architecture 106, and software 108. The head unit may be comprised of one or more hardware elements of in-vehicle including a computing system (e.g., 509 of FIG. 5), a touch screen (e.g., 508 of FIG. 5), a display screen (e.g., 511 of FIG. 5), various control dials, knobs and buttons, memory, processor(s), and any interface elements (e.g., connectors or ports) may form an integrated head unit that is installed in an instrument panel of a vehicle. The base system architecture 106 may include circuit boards and circuitry to operate the speakers and head unit. The software 108 may include software modules comprised of executable computer instructions to operate the speakers 102, head unit 104, and base system architecture 106. The software 108 may provide for rudimentary infotainment system operation including volume control, audio channel selection, bass/treble control, and speaker balance.

A middle level infotainment system 120, which may be referred to as a non-branded premium audio system, may include midrange speakers 122, tweeter speakers 127, amplifier 123, midlevel head unit 124, midlevel system architecture 126, and midlevel software 128. The midrange speakers 122 are different from speakers 102, midlevel head unit 124 is different from base head unit 104, midlevel system architecture 126 is different from base architecture 106, and midlevel software 128 is different from base software 108. In particular, midrange speakers 122 may accept a greater amount of power than base speakers 102, midlevel head unit 124 may provide more functionality than base head unit 104, midlevel architecture 126 may be more sophisticated an provide greater functionality than base architecture 106, and midlevel software 128 may provide increased functionality as compared to base software 108. For example, midlevel or non-branded system 102 may include a base group of surround sound features that may not be available in base infotainment system 100.

An upper level infotainment system 150, which may be referred to as a branded premium audio system, may include midrange speakers 152, tweeter speakers 157, amplifier 153, high level head unit 154, high level system architecture 156, and high level software 158. The high range speakers 152 are different from speakers 122, high level head unit 154 is different from midlevel head unit 124, high level system architecture 156 is different from midlevel architecture 126, and high level software 158 is different from midlevel software 158. In particular, high range speakers 152 may provide improved performance and power as compared to midlevel speakers 122, high level head unit 154 may provide more functionality than midlevel head unit 124, high level architecture 156 may be more sophisticated and it may provide greater functionality than midlevel architecture 126, and high level software 158 may provide increased functionality as compared to midlevel software 138. For example, high level or branded system 152 may include an advanced group of surround sound features that may not be available in midlevel infotainment system 130. Further, branded system 152 may accommodate communications between remote devices and high level system 150, which may not be available in the base infotainment system 100 or the midlevel system 120.

While these distinct systems may offer an end user a choice of functionality and performance, the end user may have to purchase a vehicle option package that does not align with the end user's desires for an infotainment system. For example, to have a high level infotainment system built into a vehicle, an end user may also have to purchase leather seats and a high output driveline when the end user simply wishes to have a high level infotainment system. Further, once the end user has selected a vehicle with a desired level infotainment system, the end user has to accept the features and performance of the selected infotainment system, or replace significant portions of the selected infotainment system.

Figure 2:
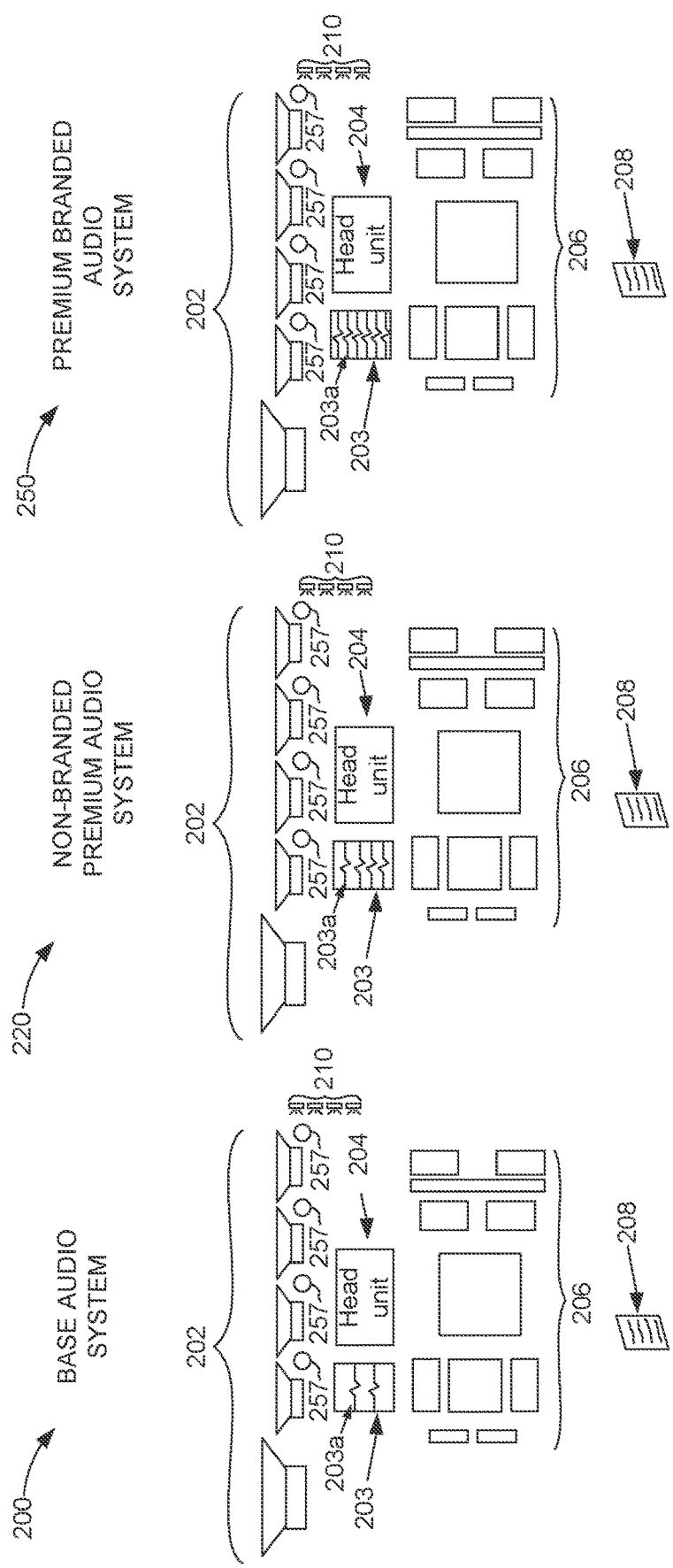
FIG. 2 shows an example schematic view of infotainment system configurations for three different infotainment system levels according to the present disclosure.

Referring now to FIG. 2, example base, midlevel, and premium branded infotainment systems are shown according to the present invention. Base infotainment system 200 includes speakers 202, tweeter speakers 257, amplifier 203, base head unit 204, base architecture 206, and base software 208. Likewise, non-branded premium infotainment system 202 includes the same base infotainment system 200 includes speakers 202, tweeter speakers 257, amplifier 203, base head unit 204, base architecture 206, and base software 208. Further, premium branded infotainment system 250 includes the same base infotainment system 200 includes speakers 202, tweeter speakers 257, amplifier 203, base head unit 204, base architecture 206, and base software 208. However, it should be noted that in some examples some system components may be different between the various levels. For example, premium infotainment system 250 may include a different group of speakers than the base infotainment system 200. Each level of infotainment system may also include feature lighting 210 that illuminates components in the infotainment system that are activated. For example, an individual light included in lights 210 may be provided for a speaker included in speakers 202. If the speaker is activated (e.g., receiving electrical power) the individual light may be activated to indicate that a higher level of performance and/or functionality is being provided by the speaker.

Differentiation between the system levels may be provided via selectively activating and deactivating hardware components and software modules, thereby increasing and/or decreasing system performance and functionality. For example, although the base infotainment system 200 may include the same speakers 202 and tweeters 257 as premium branded infotainment system 250, base infotainment system 200 may only activate a fraction of speakers 202. Further, tweeter speakers 257 may be deactivated in the base infotainment system 200. The base infotainment system 200 may also include fewer output channels (e.g., 2 channels) that are activated in the amplifier 203 of base infotainment system 200. Amplifier output circuits 203a may be selectively activated and deactivated to activate and deactivate amplifier channels. In addition, the base infotainment system 200 may also operate with a reduced software feature set. For example, the base infotainment system 200 may include options for adjusting bass and treble; however, the base infotainment system 200 may not include surround sound capability.

The non-branded premium infotainment system or midlevel infotainment system 220 may include a greater number of activated amplifier output channels (e.g., four) as compared to the base infotainment system 200 even though all or many of the hardware components and software modules may be shared between the two different levels of infotainment systems. Non-branded premium infotainment system 220 may activate all speakers 202; however, tweeter or special function speakers 257 may not be activated in the non-branded premium infotainment system 220. Non-branded premium infotainment system 220 may also activate software modules so that non-branded premium infotainment system 220 operates as a surround sound system. Software modules may include executable instructions that are executable as subroutines when a particular infotainment system level is activated. Software modules may also include executable instructions that are included with other instructions, but these instructions may be conditionally performed according to the particular infotainment system level that is activated.

The branded premium infotainment system or high level infotainment system 250 may include a greater number of activated amplifier output channels (e.g., five) as compared to the non-branded premium infotainment system 220. All speakers 202 including tweeter or special function speakers 257 may be activated in branded premium infotainment system 250. All software modules may also be activated in branded premium infotainment system 250. Premium branded infotainment system 250 may include software modules that activated surround sound, zonal sound control, adjustable surround sound gains, adjustable speaker gains, speaker over-power protection algorithms, adjustable filters, adjustable surround sound delay times, external device communication algorithms, and sound control algorithms that improve inter personal communication within a vehicle.

Thus, each of the base, non-branded premium, and branded premium infotainment systems may include the same hardware (e.g., speakers, amplifiers, head units, and circuitry), or much of the same hardware. However, only selected portions of the infotainment system hardware may be activated (e.g., supplied with electrical power) depending on the level of infotainment system that is purchased or subscribed. Likewise, only selected portions of the infotainment system software may be activated (e.g., executed via a controller) depending on the level of infotainment system that is purchased or subscribed. As a result, a vehicle manufacturer need only install and warehouse hardware components that are common to all infotainment system levels. As such, a mono-architecture infotainment system as described herein may provide cost, flexibility, and performance desired by consumers, while reducing vehicle assembly complexity and warehousing for vehicle manufacturers. In addition, such a mono-architecture infotainment system may allow infotainment system manufactures and vehicle manufacturers to recover cost and generate profit beyond vehicle point of sale models.

Figure 3:
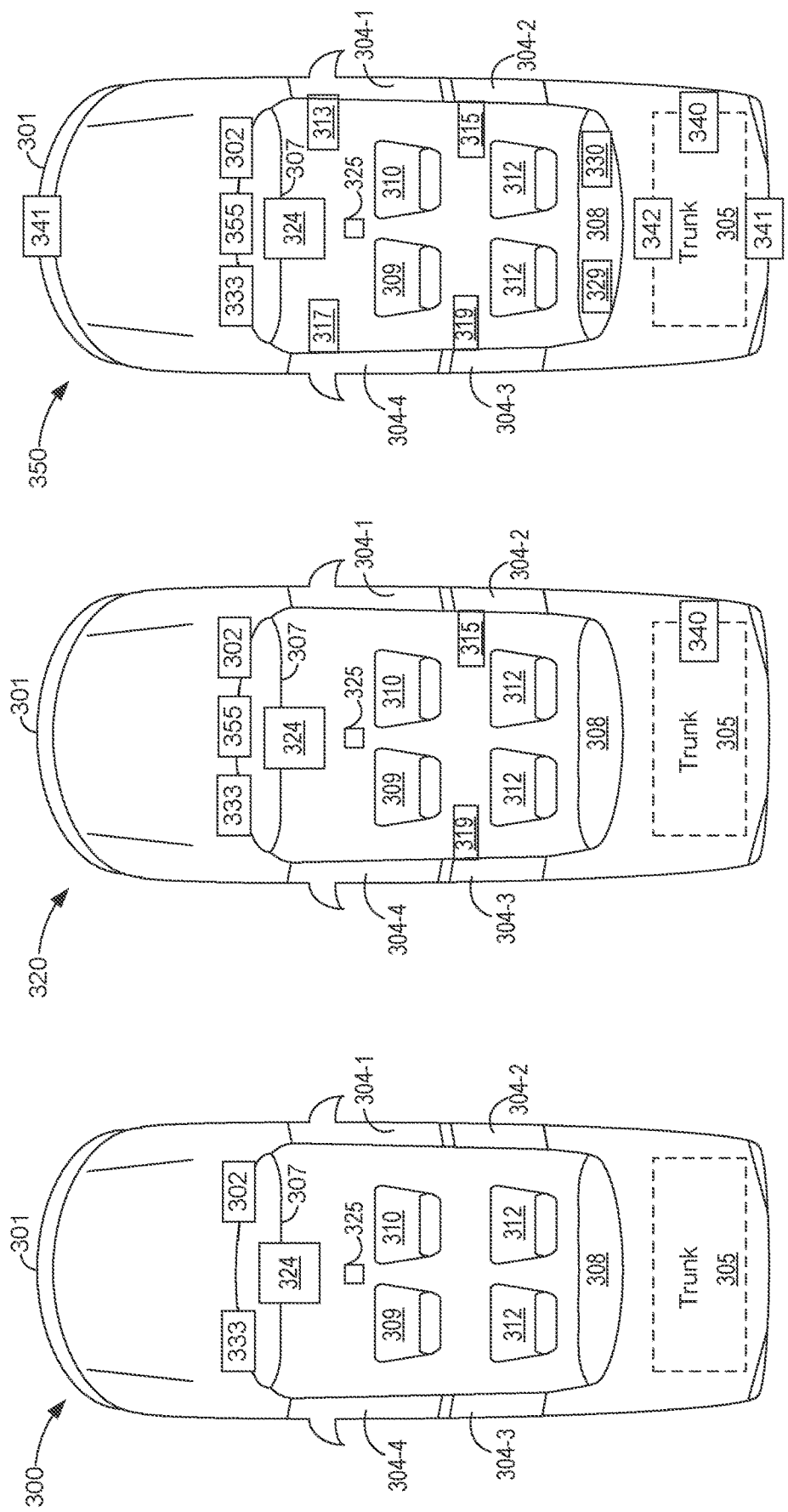
FIG. 3 shows three example vehicle infotainment system configurations according to the present disclosure.

Turning now to FIG. 3, an infotainment system with scalable architecture is shown. Vehicle 301 is show with three levels of an infotainment system. Infotainment system 300 is a base infotainment system. Infotainment system 320 is a midlevel or premium non-branded infotainment system that has been scaled up from base infotainment system 300. Infotainment system 350 is a high level or premium branded infotainment system that has been scaled up from midlevel infotainment system 320.

Infotainment system 300 includes a front left speaker 333, a front right speaker 302, a head unit 324, and microphone 325. Vehicle 301 includes a front left door 304-4, a rear left door 304-3, a front right door 304-1, and a rear right door 304-2. Vehicle 301 also includes a rear deck 308 and a trunk or boot 305.

Infotainment system 320 includes a front left speaker 333, a front right speaker 302, a head unit 324, and microphone 325. Infotainment system 320 also includes left rear door speaker 319, right rear door speaker 315, and trunk woofer 340, which are not included with infotainment system 300. Components that are indicated by common numbers in infotainment system 300 and in infotainment system 320 may be the same components.

Infotainment system 350 includes a front left speaker 333, a front right speaker 302, a head unit 324, microphone 325, left rear door speaker 319, right rear door speaker 315, and trunk woofer 340. Infotainment system 350 also includes front left door speaker 317, front right door speaker 313, rear left deck speaker 329, rear right deck speaker 330, outside speakers 341, and rear immersion speaker 342, which are not included with infotainment system 300 or infotainment system 320. Components that are indicated by common numbers in infotainment system 350 and in infotainment system 320 may be the same components.

Thus, the present description also provides for scaling system size by adding hardware components (e.g., speakers) for each performance/functionality level increases. The head unit 324 and amplifiers may be scaled up or down in features and/or performance so that all speakers that are included in the infotainment system may be driven and operated. For example, software in head unit 324 may be activated for increasing an actual total number of activated speaker channels if an end user purchases a premium infotainment system at a point of vehicle sale.

Infotainment systems shown in FIGS. 2 and 3 (e.g., 200, 220, 250, 300, 320, and 350) may include any or a combination of the sound processing systems and methods described below. However, these features may be selectively activated in some examples. The vehicle 301 shown in FIG. 3 includes doors 304, a driver seat 309, a front passenger seat 310, and rear seats 312. While a four-door vehicle is shown including doors 304-1, 304-2, 304-3, and 304-4, the infotainment systems may be used in vehicles having more or fewer doors. The vehicle 301 may be an automobile, truck, boat, or the like. Smaller vehicles may have only one or more seats. While a particular example configuration is shown, other configurations may be used including those with fewer or additional components.

The infotainment system (which may include an amplifier and/or other audio processing device for receiving, processing, and/or outputting audio to one or more speakers of the vehicle) may improve the spatial characteristics of surround sound systems. The infotainment systems shown in FIGS. 2 and 3 (e.g., 200, 220, 250, 300, 320, and 350 support the use of a variety of audio components such as radios, COs, DVDs, their derivatives, and the like. The infotainment systems may use 2-channel source material such as direct left and right, 5.1 channel, 6.2 channel, 7 channel, 12 channel and/or any other source materials from a matrix decoder digitally encoded/decoded discrete source material, and the like.

The amplitude and phase characteristics of the source material and the reproduction of specific sound field characteristics in the listening environment both play a key role in the successful reproduction of a surround sound field.

The infotainment systems shown in FIGS. 2 and 3 may improve the reproduction of a surround sound field by controlling the amplitude, phase, and mixing ratio between discrete and passive decoder surround signals and/or the direct two-channel output signals, in at least one example. The amplitude, phase, and mixing ratios may be controlled between the discrete and passive decoder output signals. The spatial sound field reproduction may be improved for all seating locations by re-orientation of the direct, passive, and active mixing and steering parameters, especially in a vehicle environment.

The mixing and steering ratios as well as spectral characteristics may be adaptively modified as a function of the noise and other environmental factors. In a vehicle, information from the data bus, microphones, and other transduction devices may be used to control the mixing and steering parameters.

The vehicle 301 may have a front center speaker (CTR speaker) 355, a front left speaker (FL speaker) 333, a front right speaker (FR speaker) 302, and at least one pair of surround speakers.

The surround speakers may be a left side speaker (LS speaker) 317 and a right side speaker (RS speaker) 313, a left rear speaker (LR speaker) 329 and a right rear speaker (RR speaker) 330, or a combination of speaker sets. Other speaker sets may be used. While not shown, one or more dedicated subwoofers or other drivers may be present. Possible subwoofer mounting locations include the trunk 305, below a seat, or the rear shelf 308. The vehicle 301 may also have one or more microphones 350 mounted in the interior.

Each CTR speaker, FL speaker, FR speaker, LS speaker, RS speaker, LR speaker, and RR speaker may include one or more transducers of a predetermined range of frequency response such as a tweeter, a mid-range, or a woofer. The tweeter, mid-range, or woofer may be mounted adjacent to each other in essentially the same location or in different locations. For example, the FL speaker 333 may be a tweeter located in door 304-4 or elsewhere at a height roughly equivalent to a side mirror or higher. The FR speaker 302 may have a similar arrangement to FL speaker 333 on the right side of the vehicle (e.g., in door 304-1).

The LR speaker 329 and the RR speaker 330 may each be a woofer mounted in the rear shelf 308. The CTR speaker 355 may be mounted in the front dashboard 307, in the roof, on or near the rear-view mirror, or elsewhere in the vehicle 301. In other examples, other configurations of loudspeakers with other frequency response ranges are possible. In some embodiments, additional speakers may be added to an upper pillar in the vehicle to enhance the height of the sound image. For example, an upper pillar may include a vertical or near-vertical support of a car's window area. In some examples, the additional speakers may be added to an upper region of an "A" pillar toward a front of the vehicle.

The surround sound speakers may operate in zonal control modes whereby sound in a particular zone of the vehicle's cabin (e.g., driver's seat, front passenger seat, etc.) may be optimized for a particular sound effect or venue recreation. For example, delay times of sound and filtering frequencies of sound may be adjusted to optimize sound in a particular zone of the passenger cabin.

Referring now to FIG. 4, an example content management system for vehicle infotainment systems is shown. In one example, the content management system 400 includes an infotainment system manufacturer 470 including computer servers 471, vehicle retailer 472 including computer servers 473, and vehicle manufacturer 474 including computer servers 475. However, one or more of the vehicle retailer 472, vehicle manufacturer 474, and infotainment manufacturer 470 may not be included in the content management system 400, if desired. In addition, additional vehicle manufacturers may be included in the content management system for vehicle infotainment systems, if desired. Servers 471, 473, and 475 may include non-transitory memory 471a, 473a, and 475a for storing executable instructions to perform functions and procedures described herein.

An end user or human customer 482 may request system upgrades or downgrades via internet 485 or wireless network 492. The human customer 482 may request infotainment system upgrades (e.g., increase infotainment system hardware and/or software that is activated) or downgrades (e.g., decrease infotainment system hardware and/or software that is activated) via a mobile device 481. Alternatively, human customer 482 may request infotainment system upgrades or downgrades via a computer 480. Human customer 482 may also request infotainment system upgrades or downgrades at vehicle retailer 472.

Infotainment manufacturer 470 may include one or more computer servers 471 to manage subscriptions and purchasing information for infotainment systems 461, 463, and 465 included in a plurality of vehicles including 460, 462, and 466. Infotainment systems 461, 463, and 465 may be examples of the infotainment systems 200, 220, and 250 shown in FIG. 2. Vehicles 460, 462, and 464 may examples of vehicle 301 shown in FIG. 3. One or more servers 471 may also provide invoices to customers 482 and distribute revenue to vehicle manufactures 474 and vehicle retailers 472. Computer servers 471 may take requests for infotainment system upgrades or downgrades from vehicle retailers 472, vehicle manufacturers 474, and end users 482. In particular, infotainment manufacture 470 may receive infotainment system upgrade requests from end users 482, vehicle manufactures 474, and vehicle retailers 472 via internet 485 or wireless network 492. Infotainment system manufacturer 470 may transmit requests for upgrades and downgrades of infotainment systems 461, 463, and 465 via wireless network 492 or satellites 490. Requests for infotainment system upgrades or downgrades may be encrypted for security purposes and they may include a security key or code that confirms that infotainment manufacturer 470 has authority to request upgrades or downgrades of infotainment systems 461, 463, and 465.

Vehicle retailer 472 may include servers 473 to make requests for upgrades or downgrades of infotainment systems 461, 463, and 465 to infotainment manufacturer 470 via internet 485, satellite 490, or wireless network 492. For example, at time of vehicle sale, end user 481 may request a particular infotainment system configuration. Vehicle retailer 472 may request that infotainment manufacturer 470 provide the particular infotainment system configuration within a particular vehicle. Vehicle retailer 472 may invoice end user 481 and distribute proceeds to infotainment manufacturer 470 and vehicle manufacturer 474.

Vehicle manufacturer 474 may include servers 475 to receive requests for upgrades or downgrades of infotainment systems 461, 463, and 465 from vehicle retailer 472 via internet 485, satellite 490, or wireless network 492. For example, vehicle retailer 472 may request that vehicle manufacturer 474 build a particular vehicle with a particular infotainment system configuration. Vehicle manufacture may build the vehicle according to the request and invoice vehicle retailer 472 according to the infotainment system request. Vehicle retailer 472 may transmit revenue to infotainment system manufacturer after the vehicle build is complete.

Vehicle 464 is shown with infotainment system 465, which includes a plurality of software modules 402-448. Vehicle 464 also includes a transceiver 491 to receive upgrade/downgrade requests for the infotainment system configuration. Alternatively, or in addition, infotainment system 465 may include a data port for receiving upgrade/down requests for the infotainment system configuration.

Infotainment system 465 includes non-transitory memory or read only memory 492 for storing software modules 402-408. Requests for infotainment system upgrades or downgrades may be processed via security layer software module 402. Security layer software module 402 may verify or deny an upgrade/downgrade request for infotainment system 465. The security layer software module 402 may confirm that the upgraded/downgraded request is meant for infotainment system 465 and that the requested configuration is a valid infotainment system configuration. If infotainment system 465 receives a valid configuration, the request is directed to software modules that activate the appropriate hardware and software upgrades or downgrades.

Infotainment system 465 may include a base hardware activation software module 404 and a base software activation software module 406. The base hardware activation software module 404 may include software that activates specific hardware for the base infotainment configuration and deactivates hardware for other infotainment configurations (e.g., Level II or non-branded premium level and level III or branded premium level). In one example, the base hardware activation software module 406 may activate circuitry to activate selected amplifier channels and deactivate different amplifier channels. For example, the base hardware activation software module 406 may activate two amplifier channels that may carry electrical signals to speakers. The base hardware activation software module 406 may also deactivate select amplifier channels that may carry electrical signals to speakers. The base hardware activation software module 406 may also activate lights (e.g., 210 of FIG. 2) that accompany speakers that are activated via activated amplifier channels so that indications of activated speakers may be provided. The base hardware activation software module may also activate knobs or other physical controls that may be associated with infotainment system 465.

Base software activation software module 406 may activate base software including but not limited to infotainment display screen software including volume control, balance control, and bass/treble control. Base software activation software module 406 may deactivate software modules that are not included in a base infotainment system configuration.

Infotainment system 465 may also include a level II or premium non-branded hardware activation software module 408. The premium non-branded hardware software module 408 may include software that activates specific hardware for the premium non-branded infotainment configuration and deactivates hardware for the level III or branded premium level. In one example, the premium non-branded hardware software module 408 includes a software module 414 for activating selected amplifier channels and deactivate different amplifier channels. By activating amplifier channels, speakers that are coupled to the amplifier channels may be activated. For example, the premium non-branded hardware software module 408 may activate four amplifier channels that may carry electrical signals to speakers via amplifier channel activation software module 414. The premium non-branded hardware software module 408 may also deactivate select amplifier channels that may carry electrical signals to speakers for the branded premium level. By deactivating amplifier channels, speakers that are coupled to the amplifier channels may be deactivated. The premium non-branded hardware software module 408 may include a hardware component lighting module 410 that may activate lights (e.g., 210 of FIG. 2) that accompany speakers that are activated via activated amplifier channels so that indications of activated speakers may be provided. The premium non-branded hardware software module 408 may also activate knobs or other physical controls that may be associated with infotainment system 465.

Infotainment system 465 may also include a level II or premium non-branded software activation software module 420. The premium non-branded software activation software module 420 may include a surround sound software activation module 422 for activating surround sound and surround sound field controls for center speaker gain, surround sound filters, digital signal processing (DSP), and surround sound delay times. The premium non-branded software activation software module 420 may also include a display enhancement software module 424 that includes display upgrade software with enhanced controls for surround sound modes and other optional modes. For example, the display enhancement software module 424 may include software for displays including volume control, balance control, bass/treble control, zonal speaker control, surround sound center channel control, dynamic compression, center speaker gain, sound delay time, simulated room size, etc. The premium branded software activation software module 420 may also include a communication software module 426. The communication activation software module 426 may permit communication between a mobile device (e.g., 481) and infotainment system 465. In addition, the communication software activation software module 426 may adjust speaker output to improve communication between humans in vehicle 464. The premium non-branded software activation module 420 may also deactivate software modules that are not included in the premium non-branded infotainment system configuration.

Infotainment system 465 may also include a level III or premium branded hardware activation software module 430. The premium non-branded hardware activation software module 430 may include software that activates specific hardware for the premium branded infotainment configuration. In one example, the premium branded hardware activation software module 430 includes a software module 434 for activating selected amplifier channels and deactivate different amplifier channels. For example, the premium branded hardware activation software module 430 may activate five or more amplifier channels that may carry electrical signals to speakers via amplifier channel activation software module 434. The premium branded hardware activation software module 430 may include a hardware component lighting module 432 that may activate lights (e.g., 210 of FIG. 2) that accompany speakers that are activated via activated amplifier channels so that indications of activated speakers may be provided. The premium branded hardware activation software module 430 may also activate knobs or other physical controls that may be associated with infotainment system 465.

Infotainment system 465 may also include a level III or premium branded software activation module 440. The premium branded software activation module 440 may include a surround sound software activation module 442 for activating surround sound field controls for center speaker gain, surround sound filters, digital signal processing (DSP), and surround sound delays. The premium branded software activation module 440 may also include a display enhancement software module 444 that includes display upgrade software with enhanced controls for surround sound mode and other optional modes. For example, the display enhancement software activation module may include software for displays including displays for volume control, balance control, bass/treble control, zonal speaker control, surround sound center channel control, dynamic compression, center speaker gain, sound delay time, simulated room size, etc. The premium branded software activation software module 440 may also include a communication software module 446. The communication activation software module 446 may permit communication between a mobile device (e.g., 481) and infotainment system 465. In addition, the communication activation software module 446 may adjust speaker output to improve communication between humans in vehicle 464. The premium branded software module 420 may also include a power management software module 448 for protecting speakers from receiving more power than may be desired. Thus, the software activation module may provide speakers protection via limiting power that may be delivered to the speakers.

Thus, a system for managing content of in vehicle infotainment systems may include servers that track requests for infotainment system upgrades and downgrades, manage invoicing and revenue, and generates requests for infotainment system upgrades and downgrades after receiving requests and payments from end users. The end users may request infotainment system upgrades and downgrades after a vehicle has been purchased at a point of sale (e.g., vehicle retailer) or at the time of vehicle purchase. Further, manufactures and vehicle retailers may request infotainment system upgrades and downgrades during vehicle build, at time of sale, or after sale without necessarily changing infotainment system hardware (e.g., speakers, amplifiers, head units, etc.).

FIG. 5 shows an example partial view of one type of environment for an audio customization system: an interior of a cabin 500 of a vehicle 502, in which a driver and/or one or more passengers may be seated. Vehicle 502 of FIG. 5 may be a motor vehicle including drive wheels (not shown) and an internal combustion engine 504. Internal combustion engine 504 may include one or more combustion chambers which may receive intake air via an intake passage and exhaust combustion gases via an exhaust passage. Vehicle 502 may be a road automobile, among other types of vehicles and it may be an example of vehicles 301 and 465 shown in FIGS. 3 and 4. In some examples, vehicle 502 may include a hybrid propulsion system including an energy conversion device operable to absorb energy from vehicle motion and/or the engine and convert the absorbed energy to an energy form suitable for storage by an energy storage device. Vehicle 502 may include a fully electric vehicle, incorporating fuel cells, solar energy capturing elements, and/or other energy storage systems for powering the vehicle.

As shown, an instrument panel 506 may include various displays and controls accessible to a human driver (also referred to as the user) of vehicle 502. For example, instrument panel 506 may include a touch screen 508 of an in-vehicle computing system 509 (e.g., an infotainment system), an audio system control panel, and an instrument cluster 510. In-vehicle computing system or infotainment system 509 may be an example of infotainment systems 200, 300, 320, 350, and 465 shown in FIGS. 2-4. Touch screen 508 may receive user input to the in-vehicle computing system or infotainment system 509 for controlling audio output, visual display output, user preferences, control parameter selection, etc. While the example system shown in FIG. 5 includes audio system controls that may be performed via a user interface of in-vehicle computing system or infotainment system 509, such as touch screen 508 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 512 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system or infotainment system 509 may adjust a radio station selection, a playlist selection, a source of audio input (e.g., from radio or CD or MP3), etc., based on user input received directly via touch screen 508, or based on data regarding the user (such as a physical state and/or environment of the user) received via external devices 550 and/or mobile device 528. Mobile device 528 may be an example of mobile device 481 shown in FIG. 4. The audio system of the vehicle may include an amplifier (not shown) coupled to plurality of loudspeakers (not shown). In some embodiments, one or more hardware elements of in-vehicle computing system or infotainment system 509, such as touch screen 508, a display screen 511, various control dials, knobs and buttons, memory, processor(s), and any interface elements (e.g., connectors or ports) may form an integrated head unit (e.g., 204 of FIG. 2) that is installed in instrument panel 506 of the vehicle. The head unit may be fixedly or removably attached in instrument panel 506. In additional or alternative embodiments, one or more hardware elements of the in-vehicle computing system or infotainment system 509 may be modular and may be installed in multiple locations of the vehicle.

The cabin 500 may include one or more sensors for monitoring the vehicle, the user, and/or the environment. For example, the cabin 500 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 500, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 550 and/or mobile device 528.

Cabin 500 may also include one or more user objects, such as mobile device 528, that are stored in the vehicle before, during, and/or after travelling. The mobile device 528 may include a smart phone, a tablet, a laptop computer, a portable media player, and/or any suitable mobile computing device. The mobile device 528 may be connected to the in-vehicle computing system via communication link 530. The communication link 530 may be wired (e.g., via Universal Serial Bus [USB], Mobile High-Definition Link [MHL], High-Definition Multimedia Interface [HDMI], Ethernet, etc.) or wireless (e.g., via Bluetooth, WIFI, WIFI direct, Near-Field Communication [NFC], cellular connectivity, etc.) and configured to provide two-way communication between the mobile device and the in-vehicle computing system. The mobile device 528 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 530 may provide sensor and/or control signals from various vehicle systems (such as vehicle audio system, climate control system, etc.) and the touch screen 508 to the mobile device 528 and may provide control and/or display signals from the mobile device 528 to the in-vehicle systems and the touch screen 508. The communication link 530 may also provide power to the mobile device 528 from an in-vehicle power source in order to charge an internal battery of the mobile device.

In-vehicle computing system or infotainment system 509 may also be communicatively coupled to additional devices operated and/or accessed by the user but located external to vehicle 502, such as one or more external devices 550. In the depicted embodiment, external devices are located outside of vehicle 502 though it will be appreciated that in alternate embodiments, external devices may be located inside cabin 500. The external devices may include a server computing system, personal computing system, portable electronic device, electronic wrist band, electronic head band, portable music player, electronic activity tracking device, pedometer, smart-watch, GPS system, etc.

External devices 550 may be connected to the in-vehicle computing system via communication link 536 which may be wired or wireless, as discussed with reference to communication link 530, and configured to provide two-way communication between the external devices and the in-vehicle computing system. For example, external devices 550 may include one or more sensors and communication link 536 may transmit sensor output from external devices 550 to in-vehicle computing system 509 and touch screen 508. External devices 550 may also store and/or receive information regarding contextual data, user behavior/preferences, operating rules, etc. and may transmit such information from the external devices 550 to in-vehicle computing system 509 and touch screen 508.

In-vehicle computing system 509 may analyze the input received from external devices 550, mobile device 528, and/or other input sources and select settings for various in-vehicle systems (such as climate control system or audio system), provide output via touch screen 508 and/or speakers 512, communicate with mobile device 528 and/or external devices 550, and/or perform other actions based on the assessment. In some embodiments, all or a portion of the assessment may be performed by the mobile device 528 and/or the external devices 550.

In some embodiments, one or more of the external devices 550 may be communicatively coupled to in-vehicle computing system or infotainment system 509 indirectly, via mobile device 528 and/or another of the external devices 550. For example, communication link 536 may communicatively couple external devices 550 to mobile device 528 such that output from external devices 550 is relayed to mobile device 528. Data received from external devices 550 may then be aggregated at mobile device 528 with data collected by mobile device 528, the aggregated data then transmitted to in-vehicle computing system 509 and touch screen 508 via communication link 530. Similar data aggregation may occur at a server system and then transmitted to in-vehicle computing system or infotainment system 509 and touch screen 508 via communication link 536/530.

FIG. 6 shows a block diagram of an in-vehicle computing system or infotainment system 509 configured and/or integrated inside vehicle 502. In-vehicle computing system or infotainment system 509 may perform one or more of the methods described herein in some embodiments. In some examples, the in-vehicle computing system or infotainment system 509 may be a vehicle infotainment system configured to provide information-based media content (audio and/or visual media content, including entertainment content, navigational services, etc.) to a vehicle user to enhance the operator's in-vehicle experience. The vehicle infotainment system 509 may include, or be coupled to, various vehicle systems, sub-systems, hardware components, as well as software applications and systems that are integrated in, or integratable into, vehicle 502 in order to enhance an in-vehicle experience for a driver and/or a passenger.

In-vehicle computing system or infotainment system 509 may include one or more processors including an operating system processor 614 and an interface processor 620. Operating system processor 614 may execute an operating system on the in-vehicle computing system, and control input/output, display, playback, and other operations of the in-vehicle computing system. Interface processor 620 may interface with a vehicle control system 630 via an inter-vehicle system communication module 622.

Inter-vehicle system communication module 622 may output data to other vehicle systems 631 and vehicle control elements 661, while also receiving data input from other vehicle components and systems 631, 661, e.g. by way of vehicle control system 630. When outputting data, inter-vehicle system communication module 622 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine CAN bus through which engine related information may be communicated, a climate control CAN bus through which climate control related information may be communicated, and a multimedia data network through which multimedia data is communicated between multimedia components in the vehicle). For example, the in-vehicle computing system or infotainment system 509 may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 608 may be included in in-vehicle computing system or infotainment system 509 to store data such as instructions executable by processors 614 and 620 in non-volatile form. The storage device 608 may store application data, including prerecorded sounds, to enable the in-vehicle computing system or infotainment system 509 to run an application for connecting to a cloud-based server and/or collecting information for transmission to the cloud-based server. The application may retrieve information gathered by vehicle systems/sensors, input devices (e.g., user interface 618), data stored in volatile 619A or non-volatile storage device (e.g., memory) 619B, devices in communication with the in-vehicle computing system (e.g., a mobile device connected via a Bluetooth link), etc. In-vehicle computing system or infotainment system 509 may further include a volatile memory 619A. Volatile memory 619A may be random access memory (RAM). Non-transitory storage devices, such as non-volatile storage device 608 and/or non-volatile memory 619B, may store instructions and/or code that, when executed by a processor (e.g., operating system processor 614 and/or interface processor 620), controls the in-vehicle computing system or infotainment system 509 to perform one or more of the actions described in the disclosure.

A microphone 602 may be included in the in-vehicle computing system or infotainment system 509 to receive voice commands from a user, to measure ambient noise in the vehicle, to determine whether audio from speakers of the vehicle is tuned in accordance with an acoustic environment of the vehicle, etc. A speech processing unit 604 may process voice commands, such as the voice commands received from the microphone 602. In some embodiments, in-vehicle computing system or infotainment system 509 may also be able to receive voice commands and sample ambient vehicle noise using a microphone included in an audio system 632 of the vehicle.

One or more additional sensors may be included in a sensor subsystem 610 of the in-vehicle computing system or infotainment system 509. For example, the sensor subsystem 610 may include a camera, such as a rear view camera for assisting a user in parking the vehicle and/or a cabin camera for identifying a user (e.g., using facial recognition and/or user gestures). Sensor subsystem 610 of in-vehicle computing system or infotainment system 509 may communicate with and receive inputs from various vehicle sensors and may further receive user inputs. For example, the inputs received by sensor subsystem 610 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc.

While certain vehicle system sensors may communicate with sensor subsystem 610 alone, other sensors may communicate with both sensor subsystem 610 and vehicle control system 630, or may communicate with sensor subsystem 610 indirectly via vehicle control system 630. A navigation subsystem 611 of in-vehicle computing system or infotainment system 509 may generate and/or receive navigation information such as location information (e.g., via a GPS sensor and/or other sensors from sensor subsystem 610), route guidance, traffic information, point-of-interest (POI) identification, and/or provide other navigational services for the driver.

External device interface 612 of in-vehicle computing system or infotainment system 509 may be coupleable to and/or communicate with one or more external devices 650 located external to vehicle 502. While the external devices are illustrated as being located external to vehicle 502, it is to be understood that they may be temporarily housed in vehicle 502, such as when the user is operating the external devices while operating vehicle 502. In other words, the external devices 550 are not integral to vehicle 502. The external devices 550 may include a mobile device 528 (e.g., connected via a Bluetooth, NFC, WIFI direct, or other wireless connection) or an alternate Bluetooth-enabled device 652.

Mobile device 528 may be a mobile phone, smart phone, wearable devices/sensors that may communicate with the in-vehicle computing system via wired and/or wireless communication, or other portable electronic device(s). Other external devices include external services 646. For example, the external devices may include extra-vehicular devices that are separate from and located externally to the vehicle. Still other external devices include external storage devices 654, such as solid-state drives, pen drives, USB drives, etc. External devices 550 may communicate with in-vehicle computing system or infotainment system 509 either wirelessly or via connectors without departing from the scope of this disclosure. For example, external devices 550 may communicate with in-vehicle computing system or infotainment system 509 through the external device interface 612 over network 660, a universal serial bus (USB) connection, a direct wired connection, a direct wireless connection, and/or other communication link.

The external device interface 612 may provide a communication interface to enable the in-vehicle computing system to communicate with mobile devices associated with contacts of the driver. For example, the external device interface 612 may enable phone calls to be established and/or text messages (e.g., SMS, MMS, etc.) to be sent (e.g., via a cellular communications network) to a mobile device associated with a contact of the driver. The external device interface 612 may additionally or alternatively provide a wireless communication interface to enable the in-vehicle computing system to synchronize data with one or more devices in the vehicle (e.g., the driver's mobile device) via WIFI direct, as described in more detail below.

One or more applications 644 may be operable on mobile device 528. As an example, mobile device application 644 may be operated to aggregate user data regarding interactions of the user with the mobile device. For example, mobile device application 644 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 644 to external device interface 612 over network 660. In addition, specific user data requests may be received at mobile device 528 from in-vehicle computing system or infotainment system 509 via the external device interface 612. The specific data requests may include requests for determining where the user is geographically located, an ambient noise level and/or music genre at the user's location, an ambient weather condition (temperature, humidity, etc.) at the user's location, etc. Mobile device application 644 may send control instructions to components (e.g., microphone, amplifier etc.) or other applications (e.g., navigational applications) of mobile device 528 to enable the requested data to be collected on the mobile device or requested adjustment made to the components. Mobile device application 644 may then relay the collected information back to in-vehicle computing system or infotainment system 509.

Likewise, one or more applications 648 may be operable on external services 646. As an example, external services applications 648 may be operated to aggregate and/or analyze data from multiple data sources. For example, external services applications 648 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 630 may include controls for controlling aspects of various vehicle systems 631 involved in different in-vehicle functions. These may include, for example, controlling aspects of vehicle audio system 632 for providing audio entertainment to the vehicle occupants, aspects of climate control system 634 for meeting the cabin cooling or heating needs of the vehicle occupants, as well as aspects of telecommunication system 636 for enabling vehicle occupants to establish telecommunication linkage with others.

Audio system 632 may include one or more acoustic reproduction devices including electromagnetic transducers such as speakers 635, which may be an example of speakers shown in FIGS. 2, 3, and 5. Vehicle audio system 632 may be passive or active such as by including a power amplifier. In some examples, in-vehicle computing system or infotainment system 509 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 634 may be configured to provide a comfortable environment within the cabin or passenger compartment of vehicle 502. Climate control system 634 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 630 may also include controls for adjusting the settings of various vehicle controls 661 (or vehicle system control elements) related to the engine and/or auxiliary elements within a cabin of the vehicle, such as steering wheel controls 662 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Vehicle controls 661 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers 635 of the vehicle's audio system 632. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 634. For example, the control signals may increase delivery of cooled air to a specific section of the cabin.

Control elements positioned on an outside of a vehicle (e.g., controls for a security system) may also be connected to computing system or infotainment system 509, such as via communication module 622. The control elements of the vehicle control system may be physically and permanently positioned on and/or in the vehicle for receiving user input. In addition to receiving control instructions from in-vehicle computing system or infotainment system 509, vehicle control system 630 may also receive input from one or more external devices 550 operated by the user, such as from mobile device 528. This allows aspects of vehicle systems 631 and vehicle controls 661 to be controlled based on user input received from the external devices 550.

In-vehicle computing system or infotainment system 509 may further include an antenna 606. Antenna 606 is shown as a single antenna, but may comprise one or more antennas in some embodiments. The in-vehicle computing system may obtain broadband wireless internet access via antenna 606, and may further receive broadcast signals such as radio, television, weather, traffic, and the like. The in-vehicle computing system or infotainment system 509 may receive positioning signals such as GPS signals via one or more antennas 606. The in-vehicle computing system may also receive wireless commands via FR such as via antenna(s) 606 or via infrared or other means through appropriate receiving devices. In some embodiments, antenna 606 may be included as part of audio system 632 or telecommunication system 636. Additionally, antenna 606 may provide AM/FM radio signals to external devices 550 (such as to mobile device 528) via external device interface 612.

One or more elements of the in-vehicle computing system or infotainment system 509 may be controlled by a user via user interface 618. User interface 618 may include a graphical user interface presented on a touch screen, such as touch screen 508 of FIG. 5, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system or infotainment system 509 and mobile device 528 via user interface 618. In addition to receiving a user's vehicle setting preferences on user interface 618, vehicle settings selected by in-vehicle control system may be displayed to a user on user interface 618. Notifications and other messages (e.g., received messages), as well as navigational assistance, may be displayed to the user on a display of the user interface. User preferences/information and/or responses to presented messages may be performed via user input to the user interface.

Thus, the system of FIGS. 1-6 provide for a vehicle infotainment system, comprising: a plurality of components electrically coupled, the plurality of components including one or more circuits that are not activated when the plurality of components are operated in a base configuration; and a controller including executable instructions stored in non-transitory memory that cause the controller to selectively activate a configuration other than the base configuration to activate one or more of the circuits that are not activated in response to an indication of a purchase of a configuration other than the base configuration. The system includes wherein the indication of the purchase is provided over air. The system includes wherein the purchase is a one-time purchase. The system includes wherein the purchase is via a subscription. The system further comprises additional instructions to activate executable instructions to provide enhanced surround sound capability to the vehicle infotainment system. The system includes wherein the executable instructions adjust surround sound gains associated with a particular vehicle. The system further comprises additional executable instructions to adjust speaker control parameters associated with a particular vehicle cabin design.

The system of FIGS. 1-6 also provides for a vehicle infotainment system, comprising: a plurality of speakers, at least one of the plurality of speakers activated when the vehicle infotainment system is operating in a base configuration, at least one of the plurality of speakers not activated in the base configuration being activated when the vehicle infotainment system is operating in a configuration other than the base configuration; and a controller electrically coupled to the one or more speakers including executable instructions stored in non-transitory memory that cause the controller to selectively activate the mode other than the base configuration via an over the air request. The system includes wherein the over the air request is generated at a point of sale of a vehicle. The system includes wherein the over the air request is generated via a vehicle manufacturer. The system includes wherein the over the air request is generated via a manufacturer of the vehicle infotainment system. The system includes wherein the configuration other than the base configuration is a premium non-branded configuration. The system includes wherein the configuration other than the base configuration is a premium branded configuration. The system further comprises additional instructions to provide a visual indication that the at least one of the plurality of speakers not activated in the base configuration is activated. The system includes wherein the visual indication is provided at a location of the at least one of the plurality of speakers not activated in the base configuration is activated. The system includes wherein the visual indication is a light.

The system of FIGS. 1-6 also provides for an infotainment system content management system, comprising: one or more servers configured to receive requests to activate at least a portion of hardware components and software modules of a plurality of infotainment systems included in a plurality of vehicles, the one or more servers also including executable instructions to activate at least the portion of the hardware components and software modules. The system further comprises additional instructions to manage subscriptions to activate hardware components and software modules for one or more of the plurality of infotainment systems. The system further comprises additional instructions to manage one-time purchases of privileges to activate hardware components and software modules for one or more of the plurality of infotainment systems.

In some examples, the system further comprises additional instructions to receive requests to deactivate at least the portion of the hardware components and software modules of the plurality of infotainment systems. The system further comprises additional instructions to deactivate at least the portion of the hardware components and software modules of the plurality of infotainment systems. The system includes wherein the requests to activate at least the portion of hardware components and software modules is received via an internet connection. The system includes wherein the requests to activate at least the portion of hardware components and software modules is received via connection to a point of sale for at least one of the plurality of infotainment systems.

The system of FIGS. 1-6 also provides for an infotainment system content management system, comprising: one or more servers configured to receive requests to activate at least a portion of hardware components and software modules of a plurality of infotainment systems included in a plurality of vehicles, the one or more servers also including executable instructions to activate adjustment of speaker control parameters. The system includes wherein the speaker control parameters include speaker gains. The system includes wherein the speaker control parameters are adjusted via an over the air request. The system includes wherein the speaker control parameters include a delay time of a sound generated via a speaker. The system includes wherein the speaker control parameters include a filter applied to a sound generated via a speaker. The system further comprises additional executable instructions to activate lighting to indicate activation of the at least one portion of hardware components. The system further comprises additional instructions to activate a speaker protection software module. The system further comprises additional instructions to activate speaker gains for a particular vehicle model. The system further comprises additional instructions to activate a sound zone software module for a particular vehicle model.

Figure 7:
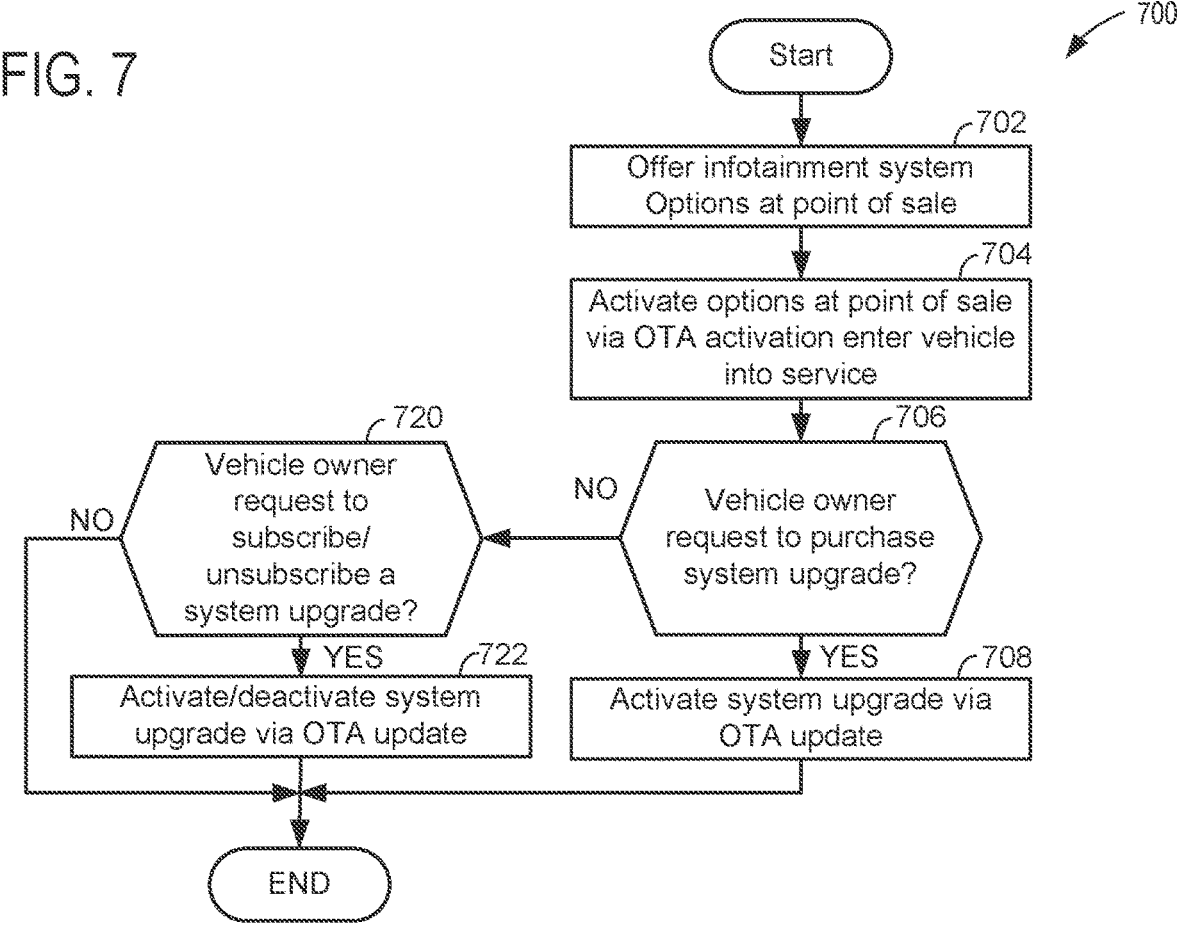
FIG. 7 is a flow chart of an example method for operating a content management system for infotainment systems.

FIG. 7 shows a flow chart for an example method 700 for managing content of infotainment systems is shown. Method 700 may be performed by content management system 400 shown in FIG. 4, which may include one or more computing systems integrated in a vehicle as well as servers. For example, method 700 may be performed by executing instructions stored in memory of servers owned by an infotainment system manufacturer, third party vender, vehicle manufacturer, or other cloud computing arrangement. The servers may operate in cooperation with in-vehicle computing systems or infotainment systems (e.g., 465, 509, etc.). The content management system 400 may perform method 700 including adjusting actuators (e.g., amplifiers and speakers) in the real world and performing operations internally that ultimately are a basis for adjusting actuators in the real world. One or more steps included in method 700 may optionally be performed.

At 702, infotainment systems are offered for purchase or by subscription (e.g., a lease arrangement whereby the user pays a monthly fee for the infotainment system). The infotainment system may be purchased or subscribed to at a vehicle retailer or from a vehicle manufacturer. Alternatively, the infotainment system may be upgraded or subscribed to by an end user requesting infotainment system purchase or subscription from an infotainment system manufacturer, vehicle manufacturer, or vehicle retainer (e.g., point of sale). The end user may request an infotainment system upgrade or downgrade via an internet connection, mobile device, or via a personal request during or after a vehicle purchase.

Vehicle manufacturers and/or vehicle retailers may also request infotainment system purchases or subscriptions. For example, vehicle manufactures may prebuild vehicles with infotainment system configurations that are expected to be ordered by end users. In such situations, the vehicle manufacturer may request a particular infotainment system level (e.g., base, non-branded premium, branded premium) from the infotainment system manufacturer for a particular vehicle. Similarly, vehicle retailers may request prebuilt vehicles with infotainment system configurations that are expected to be ordered by end users. In such situations, the vehicle retailer may request a particular infotainment system level (e.g., base, non-branded premium, branded premium) from the vehicle manufacturer for a particular vehicle. Alternatively, the vehicle retailer may request a particular infotainment system level for a particular vehicle at a time that the vehicle is being sold in response to an end user request. Method 700 proceeds to 704.

At 704, method 700 activates the requested infotainment system in a particular vehicle for vehicles that are being sold via a vehicle retailer (e.g., at the point of sale). The infotainment system may be activated by the infotainment system manufacturer or the vehicle manufacturer after payment or promissory note for the purchase or subscription is confirmed. The requested infotainment system may be activated via an over the air (OTA) wireless upgrade/downgrade request or via a request received via a data port on-board the particular vehicle. The request for the infotainment system upgrade may be transmitted from a server to a vehicle. Method 700 proceeds to 706.

At 706, method 700 judges if a vehicle owner is requesting purchase of an infotainment system upgrade. The vehicle owner may request an infotainment system upgrade via the vehicle retailer, vehicle manufacturer, or directly from the infotainment system manufacturer. The request by the vehicle owner may be made via an internet connection, cellular connection, or other known communications network. If method 700 judges that a vehicle owner or end user is requesting to purchase an infotainment system upgrade, the answer is yes and method 700 proceeds to 708. Otherwise, the answer is no and method 700 proceeds to 720.

At 708, method 700 activates the requested or purchased infotainment system upgrade after payment or a promissory note has been received. The infotainment system may be upgraded by a request that may be received at the particular vehicle that is being upgraded via an OTA communications network. If the particular vehicle receives a valid request, hardware and software may be activated as described in FIG. 4 to provide the upgrade. Method 700 proceeds to exit.

At 720, method 700 judges if a vehicle owner is requesting to subscribe or unsubscribe (e.g., downgrade) an infotainment system upgrade. The vehicle owner may request an infotainment system upgrade or downgrade via the vehicle retailer, vehicle manufacturer, or directly from the infotainment system manufacturer. The request by the vehicle owner may be made via an internet connection, cellular connection, or other known communications network. If method 700 judges that a vehicle owner or end user is requesting to subscribe to an infotainment system upgrade or to unsubscribe from an infotainment system upgrade (e.g., downgrade) the answer is yes and method 700 proceeds to 722. Otherwise, the answer is no and method 700 proceeds to exit.

At 722, method 700 activates the requested infotainment system upgrade after payment or a promissory note has been received. Alternatively, method 700 may downgrade the infotainment system configuration to a lower level if the end user wished to unsubscribe from a higher level configuration of the infotainment system. The infotainment system may be upgraded or downgrade by a request that may be received at the particular vehicle that is being upgraded or downgraded via an OTA communications network. If the particular vehicle receives a valid request, hardware and software may be activated or deactivated as described in FIG. 4 to provide the upgrade or downgrade. Method 700 proceeds to exit.

In this way, an infotainment system that is common across many vehicles may be upgraded or downgraded in particular vehicles to suit vehicle owner's performance and cost objectives. Further, an infotainment system that has a common design or nearly common design may be scaled to meet end customer wants and needs. Further still, an infotainment system that shares a common design across many vehicles may save vehicle manufacturers assembly time, assembly space, and warehousing space.

Figure 8:
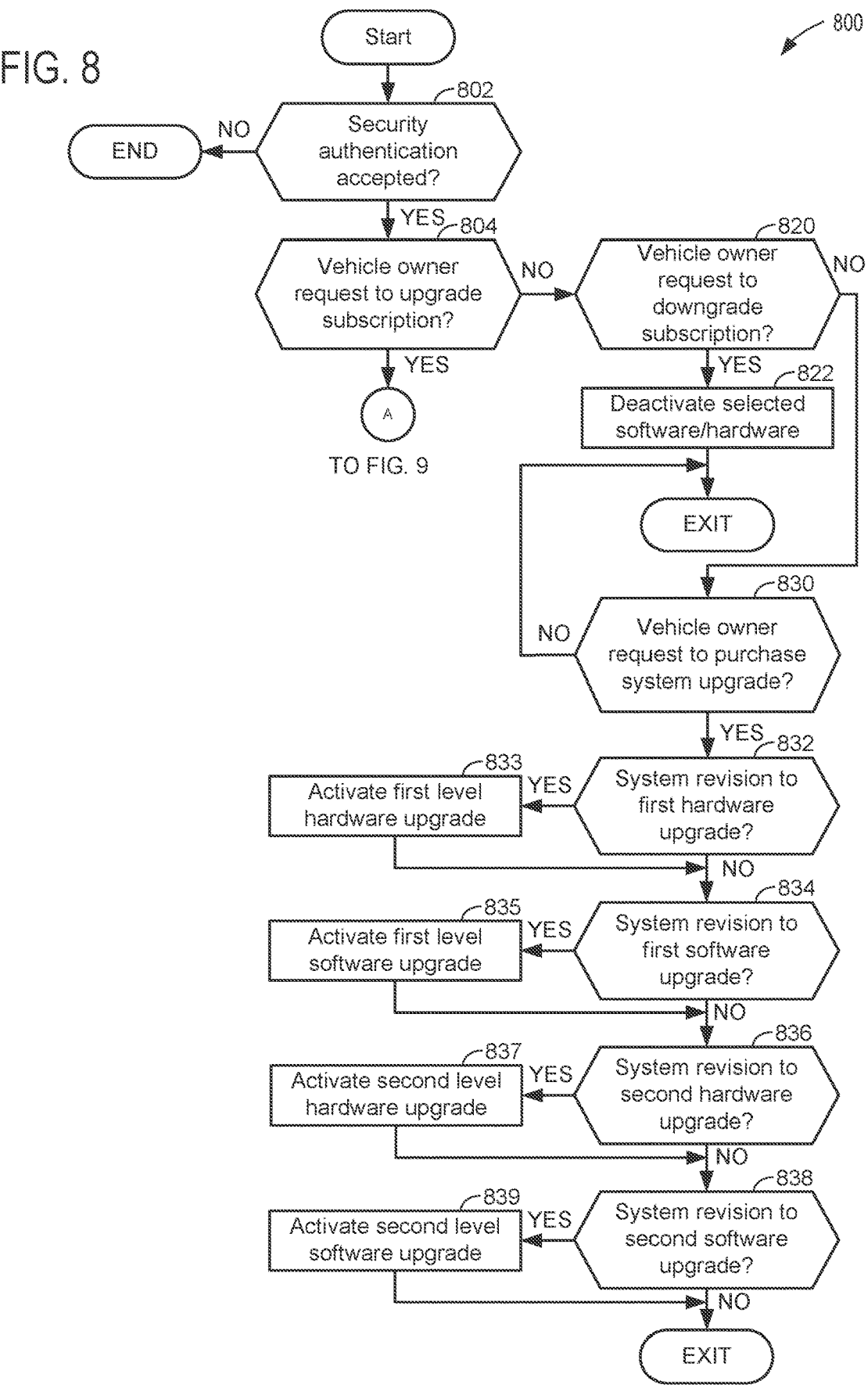
FIG. 8 is a flow chart of an example method for operating an infotainment system according to the present description.

Referring now to FIG. 8, a flow chart for an example method 800 for upgrading or downgrading active content of infotainment systems is shown. Method 800 may be performed by an infotainment system 200, 220, 250, 300, 320, 350, and 465 as shown in FIGS. 2, 3, and 4. For example, method 700 may be comprised of executable instructions stored in infotainment system memory. The infotainment system may cooperate with servers as described in the method of FIG. 7. The infotainment system may perform method 800 including adjusting actuators (e.g., amplifiers and speakers) in the real world and performing operations internally that ultimately are a basis for adjusting actuators in the real world. One or more steps included in method 800 may optionally be performed.

At 802, method 800 judges if a proper security authorization is received by and accepted by the infotainment system. The security authorization may be in the form of a security key code or alpha numeric sequence that may be unique to the particular vehicle and infotainment system that is receiving the infotainment system upgrade or downgrade request. If method 800 judges that the security authorization is proper, the answer is yes and method 800 proceeds to 804. Otherwise, the answer is no and method 800 proceeds to exit.

At 804, method 800 judges if the vehicle owner or requestor is requesting an upgrade (e.g., increase infotainment system functionality and/or performance) to an infotainment system subscription. The type of infotainment system request may be included in the infotainment system request data. The content management system may request both infotainment system upgrades and downgrades. In addition, the infotainment system itself may determine if a subscription has expired without being renewed. If method 800 judges that the vehicle owner or requestor is requesting an infotainment system subscription upgrade, the answer is yes and method 800 proceeds to 806. Otherwise, the answer is no and method 800 proceeds to 820.

At 806, method 800 judges if the infotainment system upgrade is to a first hardware level (e.g., a non-branded premium level). The upgrade level of the infotainment system request may be included in the infotainment system request data. If method 800 judges that the vehicle owner or requestor is requesting an infotainment system upgrade to a first hardware level, the answer is yes and method 800 proceeds to 807. Otherwise, the answer is no and method 800 proceeds to 808.

At 807, method 800 activates hardware included in the first upgrade level of the infotainment system. The first hardware upgrade level may include activating microphones and additional amplifier channels and speakers. The amplifier channels and speakers may be activated via a software module as discussed in the description of FIG. 4. Method 800 may also activate special purpose lighting to indicate speakers that are activated in the infotainment system. Method 800 proceeds to 808.

At 808, method 800 judges if the infotainment system upgrade is to a first software level (e.g., a non-branded premium level). The upgrade level of infotainment system request may be included in the infotainment system request data. If method 800 judges that the vehicle owner or requestor is requesting an infotainment system upgrade to a first software level, the answer is yes and method 800 proceeds to 809. Otherwise, the answer is no and method 800 proceeds to 810.

At 809, method 800 activates software included in the first upgrade level of the infotainment system. The first software upgrade level may include activating surround sound and other features as described in FIG. 4. Method 800 proceeds to 810.

At 810, method 800 judges if the infotainment system upgrade is to a second hardware level (e.g., a branded premium level). The upgrade level of infotainment system request may be included in the infotainment system request data. If method 800 judges that the vehicle owner or requestor is requesting an infotainment system upgrade to a second hardware level, the answer is yes and method 800 proceeds to 811. Otherwise, the answer is no and method 800 proceeds to 812.

At 811, method 800 activates hardware included in the second upgrade level of the infotainment system. The second hardware upgrade level may include activating microphones and additional amplifier channels and speakers. The amplifier channels and speakers may be activated via a software module as discussed in the description of FIG. 4. Method 800 may also activate special purpose lighting to indicate speakers that are activated in the infotainment system. Method 800 proceeds to 812.

At 812, method 800 judges if the infotainment system upgrade is to a second software level (e.g., a non-branded premium level). The upgrade level of infotainment system request may be included in the infotainment system request data. If method 800 judges that the vehicle owner or requestor is requesting an infotainment system upgrade to a second software level, the answer is yes and method 800 proceeds to 813. Otherwise, the answer is no and method 800 proceeds to exit.

At 813, method 800 activates software included in the second upgrade level of the infotainment system. The second software upgrade level may include activating surround sound, surround sound control parameters, and other features as described in FIG. 4. Method 800 proceeds to exit.

At 820, method 800 judges if the vehicle owner or requestor is requesting a downgrade (e.g., decrease infotainment system functionality and/or performance) to an infotainment system. The type of infotainment system request may be included in the infotainment system request data. If method 800 judges that the vehicle owner or requestor is requesting an infotainment system downgrade, the answer is yes and method 800 proceeds to 822. Otherwise, the answer is no and method 800 proceeds to 830. Alternatively, method 800 may proceed to 822 if method 800 determines that a subscription has expired without being renewed.

At 822, method 800 may deactivate software and hardware included in an upgrade infotainment system level (e.g., a non-branded premium level or a branded premium level). The software and hardware may be deactivated via discontinuing to execute selected software modules and commanding speakers and amplifier channels to an off state (e.g., not receiving electrical power). Method 800 proceeds to exit.

At 830, method 800 judges if the vehicle owner or requestor is requesting to purchase an upgrade (e.g., increase infotainment system functionality and/or performance) to an infotainment system. The type of infotainment system request may be included in the infotainment system request data. If method 800 judges that the vehicle owner or requestor is requesting to purchase an infotainment system subscription upgrade, the answer is yes and method 800 proceeds to 832. Otherwise, the answer is no and method 800 proceeds to exit.

At 832, method 800 judges if the infotainment system upgrade is to a first hardware level (e.g., a non-branded premium level). The upgrade level of infotainment system request may be included in the infotainment system request data. If method 800 judges that the vehicle owner or requestor is requesting an infotainment system upgrade to a first hardware level, the answer is yes and method 800 proceeds to 833. Otherwise, the answer is no and method 800 proceeds to 834.

At 833, method 800 activates hardware included in the first upgrade level of the infotainment system. The first hardware upgrade level may include activating microphones and additional amplifier channels and speakers. The amplifier channels and speakers may be activated via a software module as discussed in the description of FIG. 4. Method 800 may also activate special purpose lighting to indicate speakers that are activated in the infotainment system. Method 800 proceeds to 834.

At 834, method 800 judges if the infotainment system upgrade is to a first software level (e.g., a non-branded premium level). The upgrade level of infotainment system request may be included in the infotainment system request data. If method 800 judges that the vehicle owner or requestor is requesting an infotainment system upgrade to a first software level, the answer is yes and method 800 proceeds to 835. Otherwise, the answer is no and method 800 proceeds to 836.

At 835, method 800 activates software included in the first upgrade level of the infotainment system. The first software upgrade level may include activating surround sound and other features as described in FIG. 4. Method 800 proceeds to 836.

At 836, method 800 judges if the infotainment system upgrade is to a second hardware level (e.g., a branded premium level). The upgrade level of infotainment system request may be included in the infotainment system request data. If method 800 judges that the vehicle owner or requestor is requesting an infotainment system upgrade to a second hardware level, the answer is yes and method 800 proceeds to 837. Otherwise, the answer is no and method 800 proceeds to 838.

At 837, method 800 activates hardware included in the second upgrade level of the infotainment system. The second hardware upgrade level may include activating microphones and additional amplifier channels and speakers. The amplifier channels and speakers may be activated via a software module as discussed in the description of FIG. 4. Method 800 may also activate special purpose lighting to indicate speakers that are activated in the infotainment system. Method 800 proceeds to 838.

At 838, method 800 judges if the infotainment system upgrade is to a second software level (e.g., a non-branded premium level). The upgrade level of infotainment system request may be included in the infotainment system request data. If method 800 judges that the vehicle owner or requestor is requesting an infotainment system upgrade to a second software level, the answer is yes and method 800 proceeds to 839. Otherwise, the answer is no and method 800 proceeds to exit.

At 839, method 800 activates software included in the second upgrade level of the infotainment system. The second software upgrade level may include activating surround sound, surround sound control parameters, and other features as described in FIG. 4. Method 800 proceeds to exit.

In this way, an infotainment system may be upgraded or downgraded according to requests that may be generated via one or more remote servers. The infotainment system may activate and deactivate components and functionality according to purchases and subscriptions.

Figure 9:
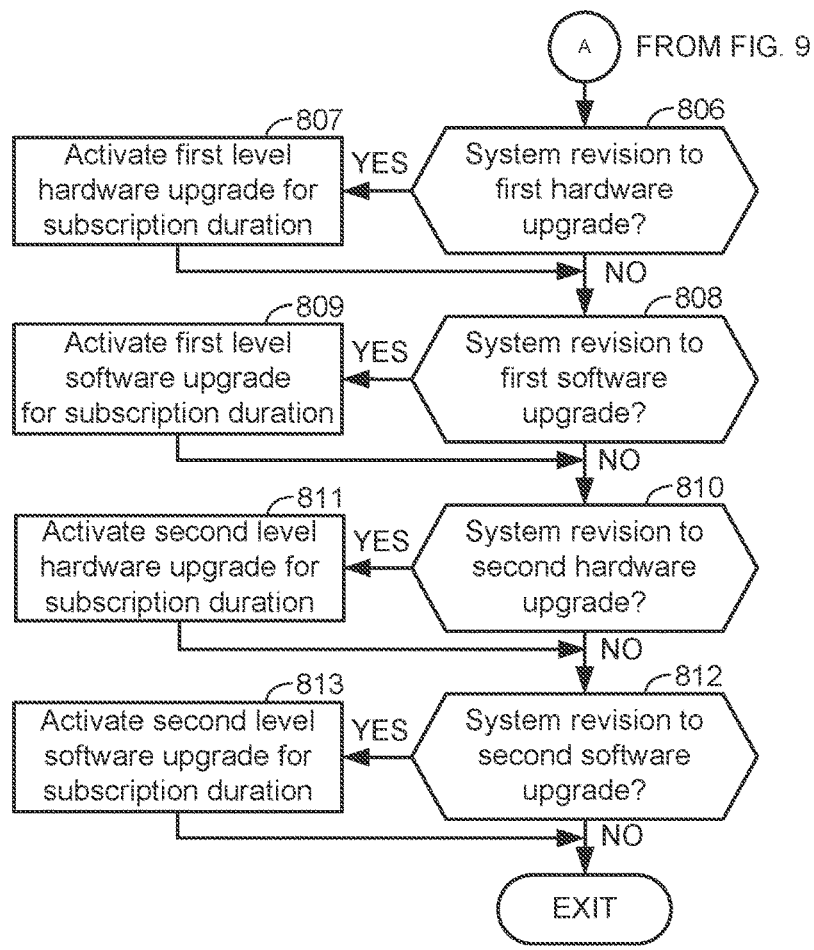
FIG. 9 shows an example gain adjustment for infotainment systems according to the present description.

Thus, the methods of FIGS. 8 and 9 provide for a method for managing content of a vehicle infotainment system, comprising: selectively activating and deactivating hardware components and software modules of a vehicle via an infotainment content management system at or after a point of sale of a vehicle. The method includes where the infotainment content management system activates and deactivates the hardware components via over the air requests. The method further comprises managing fees, proof of purchase, and receipts via the infotainment content management system. The method includes wherein the software modules include a module to adjust speaker gains.

Figure 10:
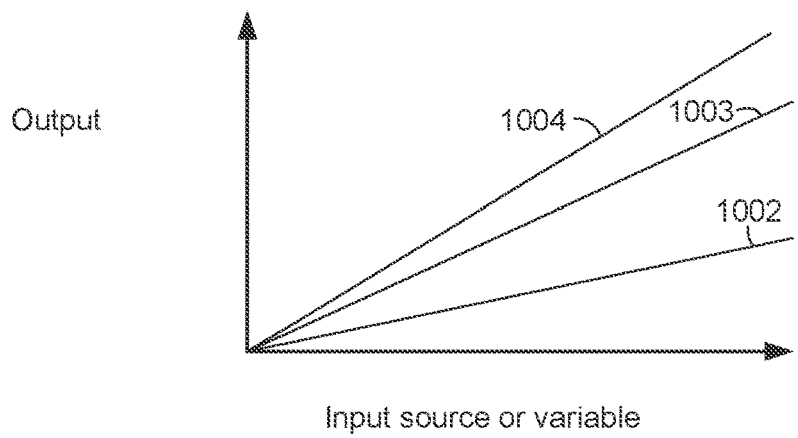
FIG. 10 shows plots of gain examples.

Turning to FIG. 10, examples of infotainment system gains are shown. The gains may apply to speaker output gain for increasing speaker output power, surround sound control parameter gains, or other types of gains that may be adjustable in an infotainment system.

Plot 1000 includes a vertical axis and a horizontal axis. The horizontal axis represents a level of an input that is being modified by a gain. The gain may be realized via hardware (e.g., an amplifier) of via software (e.g., a function that returns a value). The vertical axis represents output or input that has been modified by a gain value. Lines 1002, 1003, and 1004 represent different levels of gain.

In one example, gain that is represented by line 1002 may be activated in the base infotainment system configuration. Gain that is represented by line 1003 may be activated in a non-branded premium infotainment system configuration. Gain that is represented by line 1004 may be activated in a branded premium infotainment system configuration.

Thus, for a given input, the system output is lower when the gain of line 1002 is activated. The output is higher when the gain of line 1003 is activated, and the output is even higher when the gain of line 1004 is activated. Thus, by adjusting gain system performance may be increased or decreased.

The description of embodiments has been presented for purposes of illustration and description. Suitable modifications and variations to the embodiments may be performed in light of the above description or may be acquired from practicing the methods. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, etc. The described methods and associated actions may also be performed in various orders in addition to the order described in this application, in parallel, and/or simultaneously. Further, the described methods may be repeatedly performed. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. An in-vehicle infotainment system for a vehicle comprising:
both a set of hardware components and a set of software modules common to a first level of infotainment system, a second level of infotainment system, and a third level of infotainment system, the set of hardware components being built into the vehicle;
one or more processors; and
a non-transitory memory including executable instructions that, when executed, cause the one or more processors to:
send a request for a subscription or a one-time purchase of privileges to activate a portion of the set of hardware components and the set of software modules including one or more speakers;
receive an activation of the portion of the set of hardware components and the set of software modules including the one or more speakers, and
selectively activate the portion of the set of hardware components and the set of software modules including the one or more speakers based on the received activation.

2. The system of claim 1, wherein the request is for the subscription to activate the portion of the set of hardware components and the set of software modules.

3. The system of claim 1, further comprising additional executable instructions to request one-time purchases of privileges to activate the portion of the set of hardware components and the set of software modules.

4. The system of claim 1, further comprising additional executable instructions to request to deactivate the portion of the set of hardware components and the set of software modules.

5. The system of claim 1, further comprising additional executable instructions to deactivate the portion of the set of hardware components and the set of software modules.

6. The system of claim 1, wherein the request to activate the portion of the set of hardware components and the set of software modules is sent via an internet connection, wherein the first level of infotainment system is a level for a base infotainment system, wherein the second level of infotainment system is a level for a non-branded premium infotainment system, and wherein the third level of infotainment system is for a branded premium infotainment system.

7. The system of claim 1, wherein the request to activate the portion of the set of hardware components and the set of software modules is sent to a point of sale for at least one of the first level of infotainment system, the second level of infotainment system, and the third level of infotainment system.

8. A system comprising an in-vehicle infotainment system for a vehicle and an infotainment system content management system,
the in-vehicle infotainment system comprising:
both a set of hardware components and a set of software modules common to a first level of infotainment system, a second level of infotainment system, and a third level of infotainment system, the set of hardware components being manufacturer-installed, and the set of hardware components being audio system hardware components, and the infotainment system content management system comprising:
- one or more processors; and
- a non-transitory memory including executable instructions that, when executed, cause the one or more processors to:
  - receive a request for a subscription or a one-time purchase of privileges to activate a portion of the set of hardware components and the set of software modules including one or more amplifier channels,
  - selectively activate the portion of the set of hardware components and the set of software modules including the one or more amplifier channels, based on the received request for the subscription or the one-time purchase of privileges, and
  - activate an adjustment of speaker control parameters,
  - wherein the selective activation of one or more amplifier output circuits selectively activates the one or more amplifier channels.

9. The system of claim 8, wherein the speaker control parameters include speaker gains.

10. The system of claim 8, wherein the speaker control parameters are adjusted via an over the air request.

11. The system of claim 8, wherein the speaker control parameters include a delay time of a sound generated via a speaker.

12. The system of claim 8, wherein the speaker control parameters include a filter applied to a sound generated via a speaker.

13. The system of claim 8, the non-transitory memory further including additional executable instructions that, when executed, cause the one or more processors to activate lighting to indicate activation of the portion of the set of hardware components and the set of software modules.

14. The system of claim 8, the non-transitory memory further including additional executable instructions that, when executed, cause the one or more processors to activate a speaker protection software module.

15. The system of claim 8, the non-transitory memory further including additional executable instructions that, when executed, cause the one or more processors to activate speaker gains for a particular vehicle model.

16. The system of claim 8, the non-transitory memory further including additional executable instructions that, when executed, cause the one or more processors to activate a sound zone software module for a particular vehicle model.

17. A method for managing a system comprising an in-vehicle infotainment system for a vehicle and an infotainment system content management system, the in-vehicle infotainment system comprising both a set of hardware components and a set of software modules common to a first level of infotainment system, a second level of infotainment system, and a third level of infotainment system, and the set of hardware components being built into the vehicle during vehicle manufacture, the method comprising:
- at the infotainment system content management system, receiving a request to activate or deactivate a portion of the set of hardware components and the set of software modules of the in-vehicle infotainment system; and
- at the in-vehicle infotainment system, selectively activating or deactivating one or more amplifier output circuits of the portion of the set of hardware components and the set of software modules, based on the received request and according to at least one of a subscription and a purchase,
- wherein the selective activation of the one or more amplifier output circuits selectively activates one or more amplifier channels and selectively activates one or more speakers.

18. The method of claim 17, wherein the infotainment system content management system activates and deactivates the set of hardware components via over the air requests.

19. The method of claim 17, further comprising managing fees, proof of purchase, and receipts via the infotainment system content management system.

20. The method of claim 17, wherein the set of software modules includes a module to adjust speaker gains.

* * * * *